United States Patent
Orihashi et al.

(10) Patent No.: US 12,362,375 B2
(45) Date of Patent: Jul. 15, 2025

(54) ELECTRIC POWER SYSTEM

(71) Applicant: TOYOTA JIDOSHA KABUSHIKI KAISHA, Toyota (JP)

(72) Inventors: Nobuyuki Orihashi, Toyota (JP); Shigeki Kinomura, Toyota (JP); Tamaki Ozawa, Toyota (JP); Chiaki Kanda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 797 days.

(21) Appl. No.: 17/573,788

(22) Filed: Jan. 12, 2022

(65) Prior Publication Data

US 2022/0246955 A1 Aug. 4, 2022

(30) Foreign Application Priority Data

Jan. 29, 2021 (JP) ................. 2021-013429

(51) Int. Cl.
*H01M 8/04858* (2016.01)
*B60L 58/31* (2019.01)
*B60L 58/40* (2019.01)
*H02J 3/38* (2006.01)

(52) U.S. Cl.
CPC ........... *H01M 8/0494* (2013.01); *B60L 58/31* (2019.02); *B60L 58/40* (2019.02); *H02J 3/381* (2013.01); *H01M 2250/20* (2013.01); *H02J 2300/30* (2020.01)

(58) Field of Classification Search
CPC ........... H01M 8/0494; H01M 2250/20; H01M 8/04201; H01M 8/04619; H01M 8/04776; B60L 58/31; B60L 58/40; B60L 2240/622; B60L 53/65; B60L 53/66; B60L 53/67; B60L 53/68; B60L 53/63; B60L 58/30; H02J 3/381; H02J 2300/30; H02J 2300/20; H02J 2310/10; H02J 3/144; H02J 3/322; H02J 13/00001; H02J 7/00041; H02J 7/0048; H02J 7/007188; H02J 7/32

See application file for complete search history.

(56) References Cited

U.S. PATENT DOCUMENTS

| | | | |
|---|---|---|---|
| 2019/0199129 A1* | 6/2019 | Kobayashi | H02S 50/00 |
| 2020/0361336 A1* | 11/2020 | Yokoyama | B60L 53/66 |
| 2021/0359519 A1* | 11/2021 | Tamaru | H02J 3/28 |
| 2024/0006882 A1* | 1/2024 | Donahue | H02J 3/001 |

FOREIGN PATENT DOCUMENTS

JP 2019-135901 A 8/2019

* cited by examiner

*Primary Examiner* — Michael C Zarroli
(74) *Attorney, Agent, or Firm* — Finnegan, Henderson, Farabow, Garrett, and Dunner, LLP

(57) ABSTRACT

A CEMS server obtains meteorological information and hydrogen station information. The CEMS server predicts a power demand of a microgrid after a designated period. When the power demand of the microgrid after the designated period exceeds contract power and when an amount of electric power to be reduced exceeds a prescribed value, the CEMS server generates a hydrogen addition notification and transmits the generated hydrogen addition notification to an FCEV and/or a communication terminal. The amount of electric power to be reduced is a difference between the contract power and the power demand.

8 Claims, 4 Drawing Sheets

ELECTRIC POWER SYSTEM

This nonprovisional application is based on Japanese Patent Application No. 2021-013429 filed on Jan. 29, 2021 with the Japan Patent Office, the entire contents of which are hereby incorporated by reference.

BACKGROUND

Field

The present disclosure relates to an electric power system.

Description of the Background Art

Japanese Patent Laying-Open No. 2019-135901 discloses a demand response system that controls a device included in a demand side to perform a demand response (also referred to as "DR" below) in order to reduce an amount of electric power supplied from a power grid to the demand side. Upon acceptance of a request to perform a demand response from a power company or the like, the demand response system creates a plan of the demand response and performs the demand response.

SUMMARY

As fuel cell electric vehicles have become popular, it is conceivable that the fuel cell electric vehicles are utilized as power adjustment resources in the DR. The fuel cell electric vehicles, which have relatively high power generation capacity, for example, are expected to be utilized as power adjustment resources that respond to a negawatt DR requesting a reduction in power demand.

Herein, it is required that the fuel cell electric vehicle include sufficient hydrogen at the start of responding to a negawatt DR in order to supply electric power to a power grid (e.g., microgrid) in response to the negawatt DR. However, hydrogen stations for adding hydrogen to the fuel cell electric vehicles may be few in number and have limited opening hours compared with gasoline stations. Thus, addition of hydrogen may not be as easy as supply of gasoline. Accordingly, for example, if the user of the fuel cell electric vehicle forgets to add hydrogen to the fuel cell electric vehicle, the negawatt DR may not be responded sufficiently. As such, there is a desire for a system for restraining forgetting to add hydrogen to the fuel cell electric vehicle.

The present disclosure has been made to solve the above problem. An object of the present disclosure is to restrain forgetting to add hydrogen to a fuel cell electric vehicle.

(1) An electric power system according to an aspect of the present disclosure includes a plurality of power adjustment resources electrically connectable to a microgrid, and a power management apparatus that performs a demand response to the plurality of power adjustment resources, the demand response requesting adjustment of power supply and demand of the microgrid. The plurality of power adjustment resources include at least one fuel cell electric vehicle configured to supply electric power to the microgrid. The fuel cell electric vehicle includes a hydrogen tank that stores hydrogen. When performing a negawatt demand response, the power management apparatus transmits, earlier than a response start time by a prescribed time, a notification promoting addition of hydrogen to the hydrogen tank, the negawatt demand response being the demand response requesting a reduction in power demand, the response start time being a time to start responding to the negawatt demand response.

(2) In one embodiment, the power management apparatus transmits the notification to the fuel cell electric vehicle.

With the configuration of (1) or (2) above, when the demand response (negawatt DR) requesting a reduction in power demand is performed, earlier than the time to start responding to the negawatt DR by a prescribed time, a notification promoting addition of hydrogen to a hydrogen tank (also referred to as "hydrogen addition notification" below) is transmitted to, for example, the fuel cell electric vehicle. Owing to this hydrogen addition notification, the user of the fuel cell electric vehicle can recognize the need to add hydrogen to the fuel cell electric vehicle (hydrogen tank) in preparation for a response to the negawatt DR. This can restrain the user of the fuel cell electric vehicle from forgetting to add hydrogen to the fuel cell electric vehicle.

(3) In one embodiment, the power management apparatus transmits the notification when the power management apparatus performs the negawatt demand response and when an amount of electric power to be reduced by execution of the negawatt demand response exceeds a prescribed value.

With the above configuration, when a negawatt DR is performed and when an amount of electric power to be reduced by the negawatt DR exceeds a prescribed value, for example, a hydrogen addition notification is transmitted to the fuel cell electric vehicle. When the amount of electric power to be reduced by the execution of the negawatt DR exceeds the prescribed value, it is assumed that an amount of electric power requested to be supplied to the microgrid, which is requested from the fuel cell electric vehicle, will increase. Thus, hydrogen in the fuel cell electric vehicle is more likely to become depleted than when the amount of electric power to be reduced by the execution of the negawatt DR is not greater than the prescribed value. In other words, with the above configuration, a hydrogen addition notification is transmitted when hydrogen is more likely to become depleted, and no hydrogen addition notification is transmitted when hydrogen is less likely to become depleted. As the hydrogen addition notification is transmitted when hydrogen is more likely to become depleted, the user of the fuel cell electric vehicle can recognize the need to add hydrogen to the fuel cell electric vehicle. No hydrogen addition notification can be transmitted when hydrogen is less likely to become depleted, thus restricting a hydrogen addition notification from being made to cause a discomfort feeling to the user even when the need to add hydrogen is small.

(4) In one embodiment, the electric power system further includes a communication terminal possessed by a user of the fuel cell electric vehicle. The power management apparatus transmits the notification to the communication terminal.

With the above configuration, the hydrogen addition notification is transmitted to the communication terminal possessed by the user of the fuel cell electric vehicle, and accordingly, the user of the fuel cell electric vehicle can easily recognize the reception of the hydrogen addition notification. The user of the fuel cell electric vehicle can thus recognize the need to add hydrogen to the fuel cell electric vehicle. This can restrain the user of the fuel cell electric vehicle from forgetting to add hydrogen to the fuel cell electric vehicle.

(5) In one embodiment, the notification includes information on a prescribed hydrogen station. The prescribed hydrogen station includes (i) a hydrogen station located in the microgrid and (ii) a hydrogen station located outside the microgrid and located within a prescribed distance from the microgrid.

(6) In one embodiment, the information includes positional information of the prescribed hydrogen station.

(7) In one embodiment, the information includes information indicating opening hours of the prescribed hydrogen station.

(8) In one embodiment, the information includes information indicating a degree of crowding of the prescribed hydrogen station.

With the configurations of (5) to (8) above, the information on the prescribed hydrogen station included in the hydrogen addition notification includes positional information of the prescribed hydrogen station, information indicating opening hours of the prescribed hydrogen station, and/or information indicating a degree of crowding of the prescribed hydrogen station. The user of the fuel cell electric vehicle can accordingly know a position of the prescribed hydrogen station, know the opening hours of the prescribed hydrogen station, or know the degree of crowding of the prescribed hydrogen station. Accordingly, the user convenience can be increased, thus promoting the user to go to add hydrogen to the fuel cell electric vehicle.

(9) In one embodiment, the power management apparatus is configured to offer an incentive to a user of the fuel cell electric vehicle that has responded to the demand response. The power management apparatus offers a greater incentive to the user as a larger amount of electric power is supplied in response to the negawatt demand response.

With the above configuration, a greater incentive is offered to the user of the fuel cell electric vehicle as a larger amount of electric power is supplied in response to the negawatt DR. Accordingly, participation in the negawatt DR. Accordingly, supply and demand of the microgrid can be stabilized.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
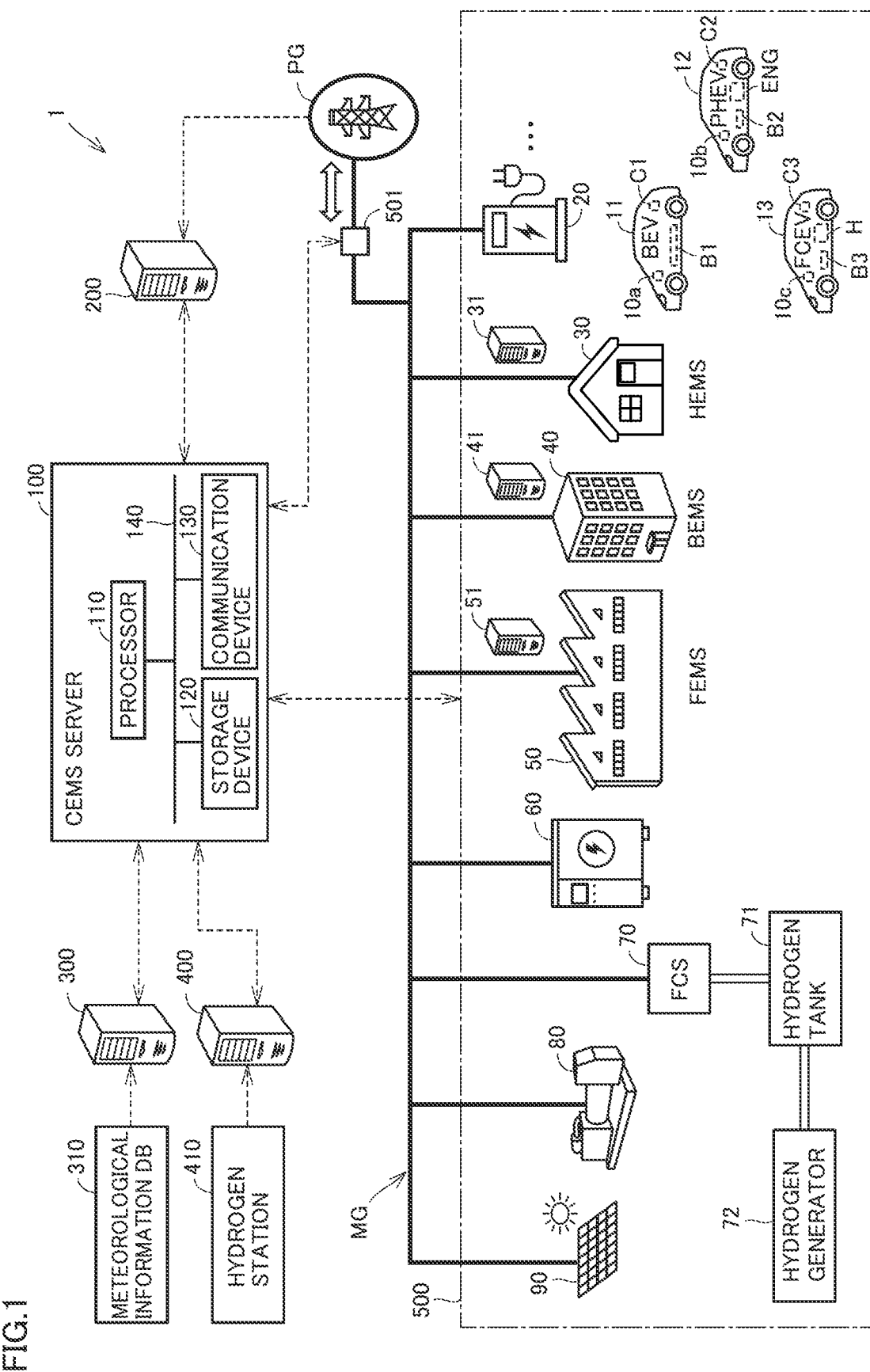
FIG. 1 shows a schematic configuration of an electric power system according to an embodiment.

An embodiment of the present disclosure will be described below in detail with reference to the drawings. The same or corresponding elements in the drawings have the same reference characters allotted, and description thereof will not be repeated.

Embodiment

Overall Configuration of Electric Power System

FIG. 1 shows a schematic configuration of an electric power system 1 according to an embodiment. Electric power system 1 includes a power grid PG, a microgrid MG, a community energy management system (CEMS) server 100, a power transmission and distribution utility server 200, a meteorological information server 300, a station management server 400, a power adjustment resource group 500, and a power reception and transformation facility 501.

Microgrid MG is a power grid that supplies electric power to one city (e.g., a smart city) as a whole. Supply and demand of electric power in microgrid MG is managed by CEMS server 100. A power line for networking of a plurality of power adjustment resources in microgrid MG may be a private power line. Microgrid MG is configured to be connected to and disconnected from power grid PG.

Power transmission and distribution utility server 200 is a computer that manages supply and demand of power grid PG. Power grid PG is a power grid constructed by a power plant (not shown) and a power transmission and distribution facility. In the present embodiment, a power company serves as a power generation utility and a power transmission and distribution utility. The power company maintains and manages power grid PG (commercial power grid). Power transmission and distribution utility server 200 belongs to the power company.

Power reception and transformation facility 501 is provided at a point of interconnection (power reception point) of microgrid MG and is configured to switch between connection (parallel in) and disconnection (parallel off) between power grid PG and microgrid MG. Power reception and transformation facility 501 is located at a point of connection between microgrid MG and power grid PG.

When microgrid MG is performing an interconnected operation while being connected to power grid PG, power reception and transformation facility 501 receives alternating-current (AC) power from power grid PG, down-converts the received power, and supplies the down-converted power to microgrid MG. When microgrid MG is performing an isolated operation while being disconnected from power grid PG, electric power is not supplied from power grid PG to microgrid MG. Power reception and transformation facility 501 includes a high-voltage-side (primary-side) switch (e.g., a section switch, an isolator, a breaker, and a load switch), a transformer, a protection relay, a measurement instrument, and a controller. CEMS server 100 is configured to receive information (e.g., a power waveform) on microgrid MG from power reception and transformation facility 501 and indicate connection and disconnection to power reception and transformation facility 501.

CEMS server 100 is configured to communicate with each of power transmission and distribution utility server 200, meteorological information server 300, station management server 400, and power adjustment resource group 500. A communications protocol may be OpenADR. Power adjustment resource group 500 includes a plurality of power adjustment resources that can be electrically connected to microgrid MG. CEMS server 100 is configured to manage the plurality of power adjustment resources included in power adjustment resource group 500. CEMS server 100 performs demand response (DR) to power adjustment resource group 500 in order to adjust supply and demand of microgrid MG. CEMS server 100 also performs a DR to power adjustment resource group 500 when it is requested to adjust supply and demand of power grid PG from power transmission and distribution utility server 200. CEMS server 100 may perform a DR to power adjustment resource group 500 in response to a request from a supply and demand adjustment market.

Meteorological information server 300 is a computer that manages meteorological information. Meteorological information server 300 obtains meteorological information from a meteorological information database (DB) 310. Meteorological information DB 310 stores, for example, information on various meteorological conditions obtained from government organizations, local administrative organizations, non-governmental agencies, and the like. The meteorological information includes, for example, information on weather, atmospheric temperature, wind velocity, sunshine, precipitation, snow precipitation, atmospheric pressure, cloud, and the like. The meteorological information also includes forecast information (a predicted value) in addition to the current information.

Station management server 400 is a computer that manages a plurality of hydrogen stations 410. Hydrogen stations 410 include, for example, a hydrogen station located in microgrid MG, as well as a hydrogen station located outside microgrid MG. Station management server 400 will be described below in detail.

Power adjustment resource group 500 includes a house 30, a facility 40, a factory 50, an energy storage system (ESS) 60, a fuel cell system (FCS) 70, a generator 80, and a variable renewable energy source 90. Each of these may function as a power adjustment resource. The plurality of power adjustment resources included in power adjustment resource group 500 are electrically connected to one another via microgrid MG. Although FIG. 1 shows one house 30, one facility 40, one factory 50, one ESS 60, one FCS 70, one generator 80, and one variable renewable energy source 90, any number of each of houses 30, facilities 40, factories 50, ESSs 60, FCSs 70, generators 80, and variable renewable energy sources 90 may be included in power adjustment resource group 500.

House 30 includes various home electrical appliances (e.g., a lighting device, an air-conditioning facility, kitchen equipment, information equipment, a television, a refrigerator, and a washing machine). House 30 may also include at least one of a charger-discharger (e.g., home EVSE), a variable renewable energy source (e.g., a photovoltaic panel provided on a roof), an ESS, an FCS, and a cogeneration system (e.g., a water heater or a heat pump water heater that uses heat generated in self-generation). Supply and demand of energy in house 30 is managed, for example, by a home energy management system (HEMS) 31. Microgrid MG and house 30 are connected to each other to supply and receive electric power therebetween. In the present embodiment, house 30 communicates with CEMS server 100 via HEMS 31.

Facility 40 includes, for example, office buildings, hospitals, and stores. Examples of the stores include department stores, shopping centers, supermarkets, or convenience stores. Supply and demand of energy in each facility is managed, for example, by a building energy management system (BEMS) 41. BEMS 41 may manage supply and demand of energy individually for each facility or may collectively manage supply and demand of energy in a plurality of facilities. Each facility included in facility 40 and microgrid MG are connected to each other to supply and receive electric power therebetween. In the present embodiment, facility 40 communicates with CEMS server 100 via BEMS 41.

Factory 50 may be, for example, a car factory or any other factory. Factory 50 includes, for example, a production line and a concentrated heat source for air-conditioning. Factory 50 may also include at least one of a variable renewable energy source (e.g., a photovoltaic power generation system or a wind power generation system), a generator (e.g., a gas turbine generator or a diesel generator), and a cogeneration system. Supply and demand of energy in factory 50 is managed, for example, by a factory energy management system (FEMS) 51. Microgrid MG and factory 50 are connected to each other to supply and receive electric power therebetween. In the present embodiment, factory 50 communicates with CEMS server 100 via FEMS 51.

ESS 60 includes a stationary battery configured to be chargeable from and dischargeable to microgrid MG. For example, the battery included in ESS 60 may be a lithium ion battery, a lead-acid battery, a nickel metal hydride battery, a redox flow battery, or a sodium-sulfur (NAS) battery. Surplus electric power generated by variable renewable energy source 90 may be stored in ESS 60.

FCS 70 includes a stationary fuel cell that generates electric power by a chemical reaction between hydrogen and oxygen. FCS 70 is connected to a hydrogen tank 71. Hydrogen tank 71 is connected to a hydrogen generator 72. FCS 70 is configured to generate electric power by using hydrogen supplied from hydrogen tank 71 and supply the generated electric power to microgrid MG. Hydrogen generator 72 can adopt any known method. For example, a method such as a by-product hydrogen method, water electrolysis, a fossil fuel reforming method, a biomass reforming method, or an iodine-sulfur (IS) process may be adopted for hydrogen generator 72. Hydrogen generator 72 may generate hydrogen by using electric power supplied from microgrid MG or using surplus electric power generated by variable renewable energy source 90. CEMS server 100 may control hydrogen generator 72 such that a remaining amount of hydrogen in hydrogen tank 71 does not fall below a prescribed value.

Generator 80 is a stationary generator that generates electric power by using fossil fuel. Generator 80 may be, for example, a gas turbine generator or a diesel generator. Generator 80 may be used as an emergency power supply.

Variable renewable energy source 90 is a power supply that varies in generated power output depending on a weather condition and provides generated electric power to microgrid MG. Variable renewable energy source 90 includes, for example, a photovoltaic power generation system and a wind power generation system. Electric power generated by variable renewable energy source 90 corresponds to variable renewable energy (VRE).

Power adjustment resource group 500 further includes electric vehicle supply equipment (EVSE) 20 and electric-powered vehicles. The electric-powered vehicles in the present embodiment include a battery electric vehicle (BEV) 11, a plug-in hybrid electric vehicle (PHEV) 12, and a fuel cell electric vehicle (FCEV) 13. Any number of pieces of EVSE 20 and electric-powered vehicles may be included in power adjustment resource group 500. Power adjustment resource group 500 may include a personally owned electric-powered vehicle (POV) or a mobility as a service (MaaS) vehicle. The MaaS vehicle is a vehicle managed by a MaaS entity.

EVSE 20 is, for example, a charging facility provided in the city. EVSE 20 is public EVSE that can be used by a user of a vehicle after prescribed authentication. An authentication method may be authentication by a charging card or authentication by communication (e.g., Plug and Charge). In the present embodiment, power adjustment resource group 500 includes a plurality of pieces of EVSE 20.

EVSE 20 functions as a power adjustment resource as electrically connected to an electric-powered vehicle (e.g., BEV, PHEV, or FCEV). For example, as a charging connector of EVSE 20 is inserted (plugged) into an inlet (or an outlet) of the electric-powered vehicle, EVSE 20 and the electric-powered vehicle are electrically connected to each other.

BEV 11 includes an electronic control unit (ECU) 10a, a battery B1, and a communication device C1. ECU 10a is configured to control each piece of equipment mounted on BEV 11. Communication device C1 is configured to communicate wirelessly with CEMS server 100. Battery B1 includes, for example, a secondary battery such as a nickel metal hydride battery or a lithium ion battery. Electric power stored in battery B1 is used for driving a motor (not shown) for travel of BEV 11 or for driving each piece of equipment mounted on BEV 11.

BEV 11 includes an electronic control unit (ECU) 10a, a battery B1, and a communication device C1. ECU 10a is configured to control each piece of equipment mounted on BEV 11. Communication device C1 is configured to communicate wirelessly with CEMS server 100. Battery B1 includes, for example, a secondary battery such as a nickel metal hydride battery or a lithium ion battery. Electric power stored in battery B1 is used for driving a motor (not shown) for travel of BEV 11 or for driving each piece of equipment mounted on BEV 11.

BEV 11 functions as a power adjustment resource as electrically connected to EVSE 20. As a charging connector of EVSE 20 is inserted into an inlet (not shown) of BEV 11, EVSE 20 and BEV 11 are electrically connected to each other. BEV 11 can receive electric power supplied from microgrid MG to charge battery B1 and supply electric power stored in battery B1 to microgrid MG, in response to a DR request from CEMS server 100.

PHEV 12 includes an ECU 10b, an engine ENG, a battery B2, and a communication device C2. ECU 10b is configured to control each piece of equipment mounted on PHEV 12. Communication device C2 is configured to communicate wirelessly with CEMS server 100. Engine ENG is a known internal combustion engine that provides motive power through combustion of fuel (gasoline or light oil), such as a gasoline engine or a diesel engine. The motive power generated by engine ENG is used as a driving force of PHEV 12 or used for driving a power generation motor (not shown). Battery B2 includes, for example, a secondary battery such as a nickel metal hydride battery or a lithium ion battery. Electric power stored in battery B2 is used for driving a motor (not shown) for travel of PHEV 12 or for driving each piece of equipment mounted on PHEV 12.

PHEV 12 functions as a power adjustment resource as electrically connected to EVSE 20. As a charging connector of EVSE 20 is inserted into an inlet (not shown) of PHEV 12, EVSE 20 and PHEV 12 are electrically connected to each other. PHEV 12 can receive electric power supplied from microgrid MG to charge battery B2 and supply electric power generated by activation of engine ENG or electric power stored in battery B2 to microgrid MG, in response to a DR request from CEMS server 100.

Although the configuration of FCEV 13 will be described below in detail, FCEV 13 includes an ECU 10c, a generator H, a battery B3, and a communication device C3. Generator H includes a hydrogen tank in which hydrogen is stored and a fuel cell that generates electric power by a chemical reaction between hydrogen and oxygen. The fuel cell generates electric power by using hydrogen supplied from the hydrogen tank. Electric power generated by generator H is used for driving a motor for travel of FCEV 13, used for driving each piece of equipment mounted on FCEV 13, or stored in battery B3. A user of FCEV 13 can add hydrogen at a hydrogen station (not shown) provided in the city.

FCEV 13 functions as a power adjustment resource as electrically connected to EVSE 20. As a charging connector of EVSE 20 is inserted into an outlet of FCEV 13, EVSE 20 and FCEV 13 are electrically connected to each other. FCEV 13 can supply electric power generated by generator H to microgrid MG, in response to a DR request from CEMS server 100.

CEMS server 100 includes a processor 110, a storage device 120, and a communication device 130. Processor 110, storage device 120, and communication device 130 are connected to one another by a bus 140. Processor 110 may be a central processing unit (CPU). Storage device 120 is configured to store various types of information. Storage device 120 stores a program executed by processor 110, as well as information (e.g., a map, a mathematical expression, and various parameters) to be used by a program. Communication device 130 includes various communication interfaces (I/Fs). Communication device 130 is configured to communicate with power transmission and distribution utility server 200, meteorological information server 300, station management server 400, and power adjustment resource group 500.

CEMS server 100 controls power adjustment resource group 500 connected to microgrid MG to function as a virtual power plant (VPP). More specifically, CEMS server 100 remotely controls power adjustment resource group 500 as being integrated as if power adjustment resource group 500 functioned as a single power plant according to an energy management technology that makes use of the Internet of Things (IoT).

In the present embodiment, the manager of microgrid MG has an electricity contract with a power company. The power company supplies electric power to microgrid MG in accordance with the electricity contract. Under this electricity contract, electric power supplied to microgrid MG from power grid PG is determined. This electric power will also be referred to as "contract power" below.

CEMS server 100 predicts supply and demand of electric power in microgrid MG and performs a demand response (DR) to power adjustment resource group 500. Specifically, for example, CEMS server 100 predicts supply and demand of electric power in microgrid MG after a designated period using meteorological information, past power supply and demand history, and the like. When predicting that a power demand in microgrid MG will exceed the contract power, CEMS server 100 performs a negawatt DR, which requests a reduction in power demand, to power adjustment resource group 500. CEMS server 100 compensates for an excess of the contract power (an amount by which the power demand exceeds the contract power) by performing a negawatt DR. The designated period can be appropriately set, for example, to several weeks, several days, or several hours. The past power supply and demand history includes, for example, information on a power demand for each day in microgrid MG, information on a power demand for each meteorological condition (e.g., weather or atmospheric temperature) in microgrid MG, and/or the like. The past power supply and demand history is stored, for example, in storage device 120. When information on a new power demand is generated, this information is stored in storage device 120 by processor 110.

In execution of a negawatt DR, CEMS server 100 grasps the capacity that can be managed in power adjustment resource group 500. CEMS server 100 then creates an implementation schedule of each power adjustment resource that has expressed participation in the DR based on the above-mentioned manageable capacity, and transmits a DR request to each power adjustment resource. For example, CEMS server 100 obtains meteorological information from meteorological information server 300, and predicts power to be generated by the variable renewable energy source (variable renewable energy source 90, and variable renewable energy sources included in house 30 and factory 50) using the obtained meteorological information. CEMS server 100 grasps the capacity that can be managed in power adjustment resource group 500 in consideration of the predicted value. When the designated period arrives (when a response start time arrives), the power adjustment resource that has received the DR request supplies electric power to microgrid MG or reduces power consumption.

CEMS server 100 may perform a negawatt DR when being requested to reduce a power demand from power transmission and distribution utility server 200. When being requested to increase a power demand from power transmission and distribution utility server 200, CEMS server 100 may perform a posiwatt DR, which requests an increase in power demand, to power adjustment resource group 500.

As fuel cell electric vehicles have become popular in recent years, it is desired that the fuel cell electric vehicles be utilized as power adjustment resources. For example, the fuel cell electric vehicles, which have relatively high power generation capacity, are expected to be utilized as power adjustment resources that respond to a negawatt DR. In the present embodiment, thus, power adjustment resource group 500 includes FCEV 13 as described above.

FCEV 13 is required to have sufficient hydrogen at the start of responding to the negawatt DR in order to respond to the negawatt DR. However, hydrogen stations for adding hydrogen to FCEV 13 (the hydrogen tank of FCEV 13) are few in number and have limited opening hours compared with gasoline stations. For this reason, addition of hydrogen to FCEV 13 may not be as easy as supply of gasoline. Thus, for example, even when FCEV 13 has expressed participation in the DR, if the user of FCEV 13 forgets to add hydrogen to FCEV 13, the negawatt DR may be responded insufficiently.

Thus, earlier than a response start time, which is a time to start responding to a negawatt DR, by a prescribed time, CEMS server 100 according to the present embodiment transmits a hydrogen addition notification to FCEV 13 that has expressed participation in the DR. The hydrogen addition notification includes, for example, a response start time to a negawatt DR and a message promoting addition of hydrogen. The information included in the hydrogen addition notification is not limited to the information described above, and any information will suffice that causes the user of FCEV 13 to recognize the need to add hydrogen to FCEV 13. As the hydrogen addition notification is transmitted to FCEV 13 earlier than the response start time to the negawatt DR by the prescribed time, the user of FCEV 13 can be caused to recognize the need to add hydrogen to FCEV 13. As such, the user of FCEV 13 can be restrained from forgetting to add hydrogen to FCEV 13. For example, the prescribed time is set to a time for adding hydrogen to FCEV 13 at the hydrogen station, such as several weeks, several days, or several hours. The hydrogen addition notification may be transmitted to FCEV 13 together with a request for negawatt DR.

In the present embodiment, further, CEMS server 100 transmits a hydrogen addition notification to FCEV 13 when CEMS server 100 performs a negawatt DR and when an amount of electric power to be reduced by the negawatt DR exceeds a prescribed value. The amount of electric power to be reduced is an excess of the contract power (an amount by which the power demand exceeds the contract power). The prescribed value is a threshold for determining that an amount of electric power supplied to microgrid MG, which is requested from FCEV 13, is not less than a reference value. When the amount of electric power to be reduced by the negawatt DR exceeds the prescribed value, it is assumed that the amount of electric power supplied to microgrid MG, which is requested from FCEV 13, will increase. Thus, hydrogen in the hydrogen tank of FCEV 13 is more likely to become depleted than when the amount of electric power to be reduced by the negawatt DR is not greater than the prescribed value. In other words, CEMS server 100 transmits a hydrogen addition notification to FCEV 13 when assuming that hydrogen in FCEV 13 is more likely to become depleted. This causes the user of FCEV 13 to recognize the need to add hydrogen to FCEV 13. On the other hand, if a hydrogen addition notification is transmitted every time the negawatt DR is performed even in the case where hydrogen in FCEV 13 is less likely to become depleted, the user of FCEV 13 may feel uncomfortable. Thus, CEMS server 100 does not transmit the hydrogen addition notification to FCEV 13 when assuming that hydrogen in FCEV 13 is less likely to become depleted. This can restrain a hydrogen addition notification from being made to cause a discomfort feeling to the user even when the need to add hydrogen is small.

CEMS server 100 may further transmit a hydrogen addition notification to a communication terminal (15 of FIG. 3, which will be described below) possessed by the user of FCEV 13 in addition to, or in place of, FCEV 13. The communication terminal is, for example, a smartphone or a tablet terminal. Information of the communication terminal is stored in storage device 120 of CEMS server 100 in association with FCEV 13. As the hydrogen addition notification is transmitted to the communication terminal, the user of FCEV 13 can easily recognize the reception of the hydrogen addition notification.

In order to improve the convenience of the user who has received the hydrogen addition notification, CEMS server 100 may include, in the hydrogen addition notification, information on a hydrogen station located in microgrid MG and a hydrogen station located outside microgrid MG and within a prescribed distance from microgrid MG (collectively referred to as "hydrogen station information" below). The hydrogen station located in microgrid MG and the hydrogen station located outside microgrid MG and within the prescribed distance from microgrid MG are also collectively referred to as "prescribed hydrogen station" below. The hydrogen station information includes, for example, positional information of the prescribed hydrogen station, information indicating opening hours of the prescribed hydrogen station, and information indicating a crowded situation of the prescribed hydrogen station.

As the positional information of the prescribed hydrogen station is included in the hydrogen addition notification, the user of FCEV 13 can know the position of each hydrogen station included in the prescribed hydrogen station. The user of FCEV 13 can thus head for a hydrogen station that is more convenient for the user.

As the information indicating the opening hours of the prescribed hydrogen station is included in the hydrogen addition notification, the user of FCEV 13 can know the opening hours of each hydrogen station included in the prescribed hydrogen station. The user of FCEV 13 can thus go to a hydrogen station that is open for business to add hydrogen, and can avoid a situation in which the hydrogen station at which the user has arrived is closed.

As the information indicating the crowded situation of the prescribed hydrogen station is included in the hydrogen addition notification, the user of FCEV 13 can know the crowded situation of each hydrogen station included in the prescribed hydrogen station. The user of FCEV 13 can thus avoid a time at which the hydrogen station is crowded or head for a hydrogen station that is not crowded.

As described above, as at least one of the positional information of the prescribed hydrogen station, the information indicating opening hours of the prescribed hydrogen station, and the information indicating the crowded situation of the prescribed hydrogen station is included in the hydrogen addition notification, the convenience of the user of FCEV 13 can be increased, thus promoting the user to go to add hydrogen to FCEV 13 (the hydrogen tank of FCEV 13).

CEMS server 100 obtains the positional information of the prescribed hydrogen station, the information indicating opening hours of the prescribed hydrogen station, and the information indicating the crowded situation of the prescribed hydrogen station from station management server 400. CEMS server 100 requests information on the hydrogen station located in microgrid MG and the hydrogen station located outside microgrid MG and within a prescribed distance from microgrid MG from station management server 400. CEMS server 100 may request the information on a hydrogen station located within a certain distance from FCEV 13 from station management server 400 based on the current position of FCEV 13. In this case, the hydrogen station located within the certain distance from the current position of FCEV 13 corresponds to the prescribed hydrogen station.

Station management server 400 pre-stores positional information and the information on opening hours of the hydrogen station managed by station management server 400 in a storage (not shown). Station management server 400 also has a function to determine the crowded situation of the hydrogen station. For example, station management server 400 may obtain image information from a camera placed in the site of the hydrogen station and perform image analysis on the image information, thereby determining the crowded situation of the hydrogen station. Alternatively, station management server 400 may monitor going in and out of fuel cell electric vehicles at the entrance and exit of the hydrogen station, and determine the crowded situation of the hydrogen station based on the monitoring result. In response to a request from CEMS server 100, station management server 400 transmits the requested positional information, information indicating opening hours, and information indicating the crowded situation of the hydrogen station to CEMS server 100.

Further, CEMS server 100 according to the present embodiment has a function to offer an incentive to the user (or manager) of the power adjustment resource that has responded to the DR. The incentive may be, for example, a general currency or a virtual currency used only in the city. CEMS server 100 may set an incentive in accordance with a degree of contribution to the DR. For example, when FCEV 13 that has responded to a negawatt DR is taken as an example, CEMS server 100 offers a greater incentive to FCEV 13 as a larger amount of electric power is supplied to microgrid MG in response to the negawatt DR. This can promote participation in the DR, thus stabilizing supply and demand of microgrid MG and/or supply and demand of power grid PG.

Configuration of FCEV

Figure 2:
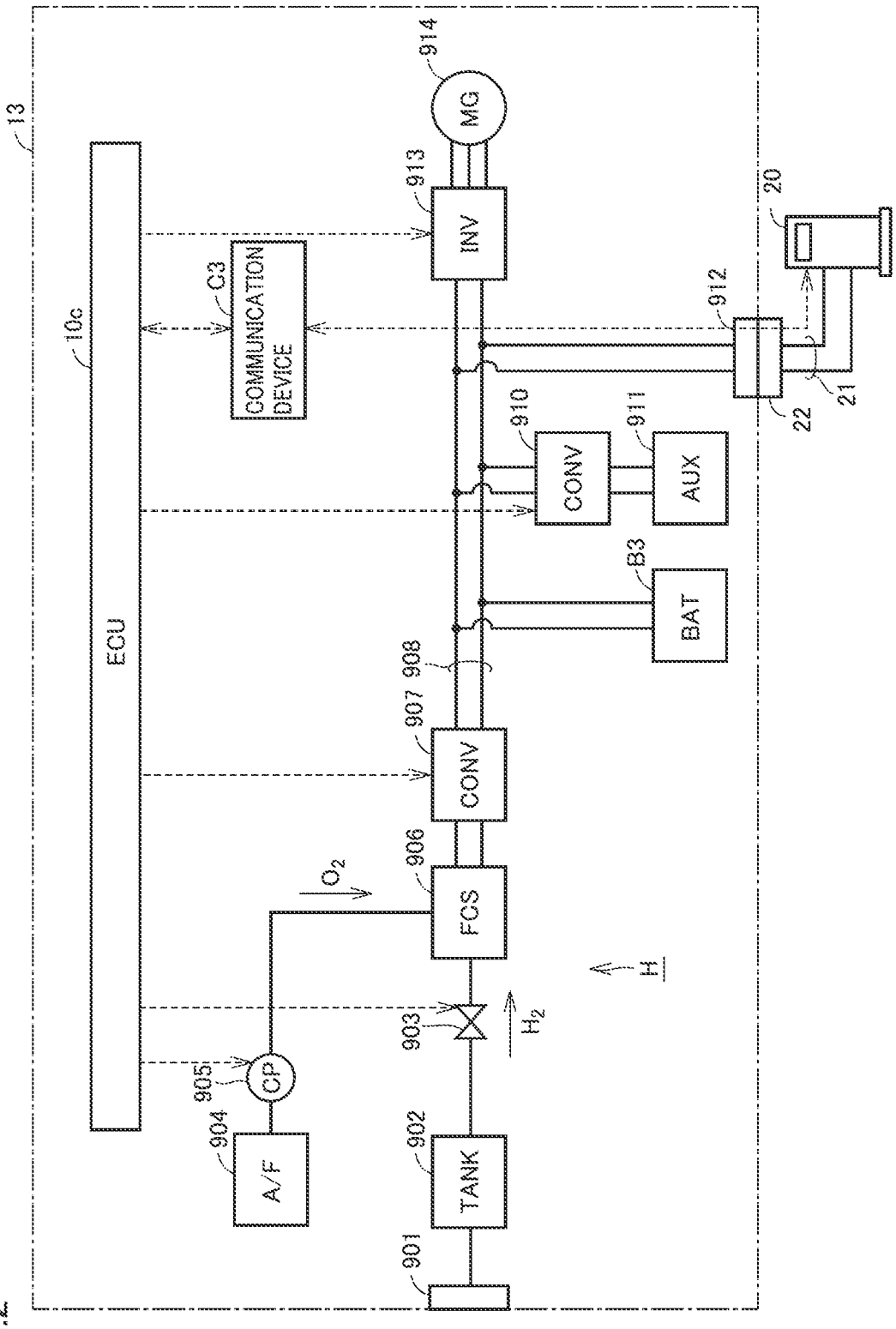
FIG. 2 schematically shows an overall configuration example of an FCEV.

FIG. 2 schematically shows an overall configuration example of FCEV 13. FCEV 13 includes generator H, a power line 908, a step-down converter 910, an auxiliary load 911, an outlet 912, an inverter 913, a motor generator 914, battery B3, ECU 10c, and communication device C3. Generator H includes a receptacle 901, a hydrogen tank 902, a supply valve 903, an air filter 904, a compressor 905, an FC stack 906, and a step-up converter 907.

Receptacle 901 is supplied with a hydrogen fuel from a hydrogen dispenser (not shown) placed in a hydrogen station. Hydrogen tank 902 stores the hydrogen fuel supplied through receptacle 901. Supply valve 903 adjusts an amount of supply of hydrogen from hydrogen tank 902 to FC stack 906 in accordance with a control command from ECU 10c.

Air filter 904 removes dust or the like in the air suctioned from the atmosphere. Compressor 905 compresses the air suctioned through air filter 904, and supplies the compressed air to FC stack 906.

FC stack 906 is, for example, a structure including a plurality of solid-polymer-type fuel cell units stacked in series. Each unit is formed by, for example, bonding catalyst electrodes to both surfaces of an electrolyte film and sandwiching the catalyst electrodes and the electrolyte film between electrically conductive separators (not shown). FC stack 906 generates electric power by an electrochemical reaction between hydrogen supplied to an anode and oxygen (air) supplied to a cathode.

Step-up converter 907 steps up the electric power generated by FC stack 906 to a high voltage (e.g., several hundred volts) in accordance with a control command from ECU 10c, and outputs the stepped-up electric power to power line 908. Power line 908 electrically connects step-up converter 907 to inverter 913.

Battery B3 is electrically connected to power line 908. Battery B3 is, for example, a lithium ion battery or a nickel-hydride battery. Battery B3 stores electric power for driving motor generator 914 and supplies the electric power to inverter 913. Battery B3 also receives electric power generated by motor generator 914 during braking of FCEV 13 or the like, thereby being charged. Battery B3 can function as an energy buffer that absorbs fluctuations in electric power externally supplied from FCEV 13.

Step-down converter 910 is electrically connected between power line 908 and auxiliary load 911. Step-down converter 910 steps down electric power transmitted on power line 908 to a prescribed voltage and outputs the stepped-down voltage to auxiliary load 911. Auxiliary load 911 corresponds to various devices that consume the electric power supplied from step-down converter 910 to be driven. Auxiliary load 911 may include lamps (such as a head lamp, a fog lamp, a cornering signal lamp, and a corner lamp), an audio device, a car navigation system, an antilock brake system (ABS), an oil pump, meters, a defogger, a wiper, and the like. Similarly to battery B3, auxiliary load 911 may also function as an energy buffer.

Outlet 912 is connectable with charging connector 22 provided at the tip of charging cable 31 of EVSE 20. Outlet 912 receives the electric power transmitted on power line 908 and outputs the electric power to EVSE 20. The electric power generated by FCEV 13 can thus be supplied to microgrid MG (external power supply).

Inverter 913 is electrically connected between power line 908 and motor generator 914. Inverter 913 drives motor generator 914 based on a drive signal from ECU 10c. Motor generator 914 is, for example, a three-phase AC synchronous motor including a rotor with an embedded permanent magnet. Motor generator 914 is driven by inverter 813 to generate a rotational driving force. The driving force generated by motor generator 914 is transmitted to driving wheels (not shown).

Communication device C3 is configured to communicate with EVSE 20 electrically connected thereto through outlet 912. Communication device C3 is also configured to communicate with CEMS server 100.

ECU 10c includes a processor, a memory, and an I/O port, which are not shown. ECU 10c controls devices that form FCEV 13 based on a program stored in the memory and signals from various sensors. ECU 10c may be divided into a plurality of ECUs by function.

In the present embodiment, ECU 10c controls external power supply by FCEV 13 in cooperation with CEMS server 100 and EVSE 20. ECU 10c performs external power supply based on a negawatt DR from CEMS server 100. Specifically, upon receipt of a negawatt DR, ECU 10c controls step-up converter 907 such that output power required for FC stack 906 is calculated based on a negawatt DR request signal, and upon arrival of the response start time, FC stack 906 outputs the calculated power.

Function of CEMS Server

Figure 3:
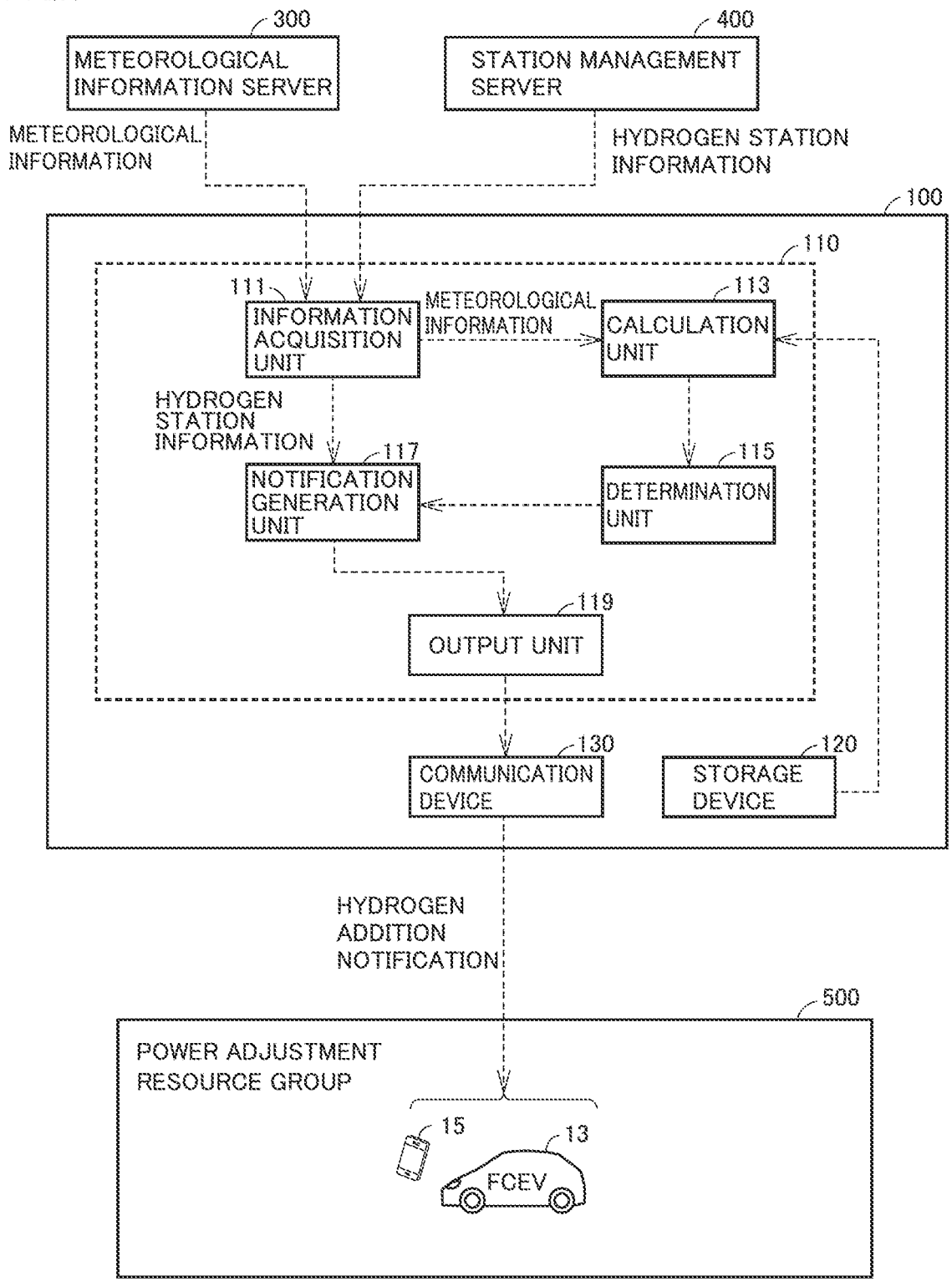
FIG. 3 is a functional block diagram for a hydrogen addition notification by a CEMS server.

FIG. 3 is a functional block diagram for a hydrogen addition notification of CEMS server 100. Referring to FIG. 3, processor 110 of CEMS server 100 includes an information acquisition unit 111, a calculation unit 113, a determination unit 115, a notification generation unit 117, and an output unit 119. For example, processor 110 functions as information acquisition unit 111, calculation unit 113, determination unit 115, notification generation unit 117, and output unit 119 by executing a program stored in storage device 120. Each of information acquisition unit 111, calculation unit 113, determination unit 115, notification generation unit 117, and output unit 119 may be implemented by, for example, dedicated hardware (electronic circuit).

Information acquisition unit 111 obtains meteorological information from meteorological information server 300. Information acquisition unit 111 outputs the obtained meteorological information to calculation unit 113. Information acquisition unit 111 also obtains information on the prescribed hydrogen station (hydrogen station information) from station management server 400. Information acquisition unit 111 outputs the obtained hydrogen station information to notification generation unit 117.

Calculation unit 113 predicts (calculates) a power demand in microgrid MG after the designated period using the meteorological information, the past power supply and demand history, and the like. The past power supply and demand history is, for example, stored in storage device 120. Calculation unit 113 reads the past power supply and demand history from storage device 120. Calculation unit 113 outputs the calculated (predicted) power demand to determination unit 115 as a calculation result.

Determination unit 115 determines whether the power demand in microgrid MG after the designated period exceeds the contract power based on the calculation result of calculation unit 113. As described above, when determining that the power demand exceeds the contract power, a negawatt DR is performed to compensate for an excess of the contract power. When determining that the power demand exceeds the contract power, determination unit 115 determines whether an amount of electric power to be reduced by the negawatt DR performed (i.e., an excess of the contract power) exceeds a prescribed value. When the amount of electric power to be reduced through execution of the negawatt DR exceeds the prescribed value, determination unit 115 outputs an instruction to generate a hydrogen addition notification to notification generation unit 117. When the amount of electric power to be reduced through execution of the negawatt DR does not exceed the prescribed value, determination unit 115 outputs an instruction to generate no hydrogen addition notification to notification generation unit 117.

Upon receipt of the instruction to generate a hydrogen addition notification from determination unit 115, notification generation unit 117 generates a hydrogen addition notification including hydrogen station information. Notification generation unit 117 outputs the generated hydrogen addition notification to output unit 119. Upon receipt of the instruction to generate no hydrogen addition notification from determination unit 115, notification generation unit 117 generates no hydrogen addition notification.

Upon receipt of the hydrogen addition notification from notification generation unit 117, output unit 119 outputs a control signal for transmitting the hydrogen addition notification to FCEV 13 and/or communication terminal 15 to communication device 130. Communication device 130 that has received the control signal transmits the hydrogen addition notification to FCEV 13 and/or communication terminal 15.

Process Performed by CEMS Server

Figure 4:
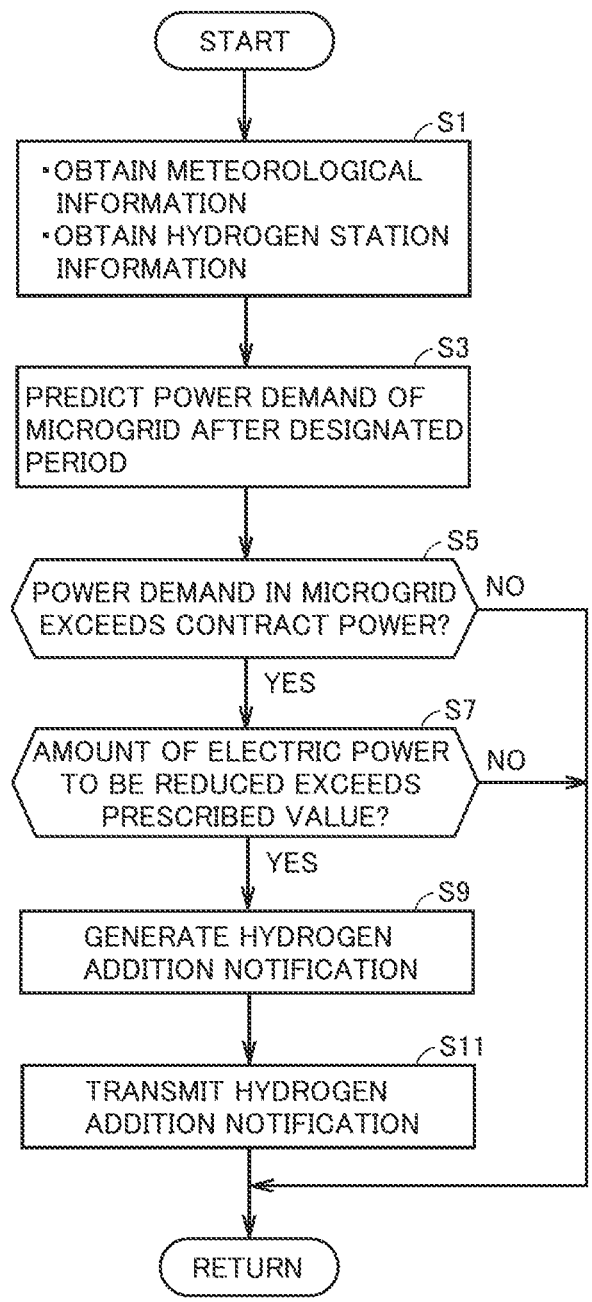
FIG. 4 is a flowchart showing a procedure of a process for the hydrogen addition notification performed by the CEMS server.

FIG. 4 is a flowchart showing a procedure of a process for a hydrogen addition notification performed by CEMS server 100. The process of the flowchart shown in FIG. 4 is repeatedly performed by CEMS server 100 for each prescribed cycle. The prescribed cycle can be appropriately set to, for example, several hours, several days, several weeks, or the like. Although description will be given to a case where each step (a step will be abbreviated as "S" below) of the flowchart shown in FIG. 4 is implemented through software processing by CEMS server 100, some or all of the steps may be implemented by hardware (electronic circuit) formed in CEMS server 100.

At S1, CEMS server 100 obtains meteorological information from meteorological information server 300. CEMS server 100 also obtains hydrogen station information from station management server 400.

At S3, CEMS server 100 predicts a power demand in microgrid MG after the designated period using the meteorological information, the past power supply and demand history, and the like.

At S5, CEMS server 100 determines whether the power demand predicted at S3 exceeds the contract power. When the power demand exceeds the contract power (YES at S5), CEMS server 100 moves the process to S7. Contrastingly, when the power demand does not exceed the contract power (NO at S5), CEMS server 100 moves the process to RETURN. The difference between the contract power and the power demand (i.e., an excess of the contract power) is an amount of electric power to be reduced.

At S7, CEMS server 100 determines whether the amount of electric power to be reduced exceeds a prescribed value. When the amount of electric power to be reduced exceeds the prescribed value (YES at S7), CEMS server 100 moves the process to S9. Contrastingly, when the amount of electric power to be reduced does not exceed the prescribed value (NO at S7), CEMS server 100 moves the process to RETURN.

At S9, CEMS server 100 generates a hydrogen addition notification including the hydrogen station information.

At S11, CEMS server 100 transmits the hydrogen addition notification to FCEV 13 and/or communication terminal 15.

Processing of S7 can be omitted. In such a case, when the power demand exceeds the contract power, CEMS server 100 moves the process to S9.

As described above, CEMS server 100 according to the present embodiment transmits a hydrogen addition notification to FCEV 13 and/or communication terminal 15 when the power demand after the designated period exceeds the contract power, that is, when CEMS server 100 performs the negawatt DR and when the amount of electric power to be reduced by the negawatt DR exceeds the prescribed value. In other words, in a response to the negawatt DR, CEMS server 100 transmits a hydrogen addition notification to FCEV 13 and/or communication terminal 15 when assuming that hydrogen in FCEV 13 is highly likely to become depleted. This causes the user of FCEV 13 to recognize the need to add hydrogen to FCEV 13.

When CEMS server 100 performs the negawatt DR and when the amount of electric power to be reduced by the negawatt DR does not exceed the prescribed value, CEMS server 100 transmits no hydrogen addition notification to FCEV 13 and/or communication terminal 15. In other words, in a response to the negawatt DR, when assuming that hydrogen in FCEV 13 is less likely to become depleted, CEMS server 100 transmits no hydrogen addition notification to FCEV 13 and/or communication terminal 15. This can restrain a hydrogen addition notification from being made to cause a discomfort feeling to the user even when the need to add hydrogen is small.

CEMS server 100 further includes hydrogen station information in the hydrogen addition notification. The hydrogen station information includes at least one of the positional information, information indicating opening hours, and information indicating a crowded situation of a prescribed hydrogen station (a hydrogen station located in microgrid MG, and a hydrogen station located outside microgrid MG and within a prescribed distance from microgrid MG). As at least one of these pieces of information is included in the hydrogen addition notification, the convenience of the user of FCEV 13 can be increased, thus promoting the user to go to add hydrogen to FCEV 13.

CEMS server 100 further offers a greater incentive to the user of FCEV 13 as a larger amount of electric power is supplied in response to the negawatt DR. This can promote participation in the DR, thus stabilizing supply and demand of microgrid MG and/or supply and demand of power grid PG.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. An electric power system comprising:
a plurality of power adjustment resources electrically connectable to a microgrid; and
a power management apparatus that performs a demand response to the plurality of power adjustment resources, the demand response requesting adjustment of power supply and demand of the microgrid, wherein
the plurality of power adjustment resources include at least one fuel cell electric vehicle configured to supply electric power to the microgrid,
the fuel cell electric vehicle includes a hydrogen tank that stores hydrogen,
when performing a negawatt demand response requesting a reduction in power demand, the power management apparatus transmits, at a time earlier than a response start time for responding to the negawatt demand response, a notification promoting addition of hydrogen to the hydrogen tank,
the notification includes information on a prescribed hydrogen station, and
the prescribed hydrogen station includes (i) a hydrogen station located in the microgrid and (ii) a hydrogen station located outside the microgrid and located within a prescribed distance from the microgrid.

2. The electric power system according to claim 1, wherein the power management apparatus transmits the notification to the fuel cell electric vehicle.

3. The electric power system according to claim 1, wherein the power management apparatus transmits the notification when the power management apparatus performs the negawatt demand response and when an amount of electric power to be reduced by execution of the negawatt demand response exceeds a prescribed value.

4. The electric power system according to claim 1, further comprising a communication terminal possessed by a user of the fuel cell electric vehicle,
wherein the power management apparatus transmits the notification to the communication terminal.

5. The electric power system according to claim 1, wherein the information includes positional information of the prescribed hydrogen station.

6. The electric power system according to claim 1, wherein the information includes information indicating opening hours of the prescribed hydrogen station.

7. The electric power system according to claim 1, wherein the information includes information indicating a degree of crowding of the prescribed hydrogen station.

8. The electric power system according to claim 1, wherein
the power management apparatus is configured to offer an incentive to a user of the fuel cell electric vehicle that has responded to the demand response, and
the power management apparatus offers a greater incentive to the user as a larger amount of electric power is supplied in response to the negawatt demand response.

* * * * *